No. 669,909. Patented Mar. 12, 1901.
A. C. YOUNG.
MINE CAP FOR DRAFT ANIMALS.
(Application filed Oct. 7, 1899.)
(No Model.)
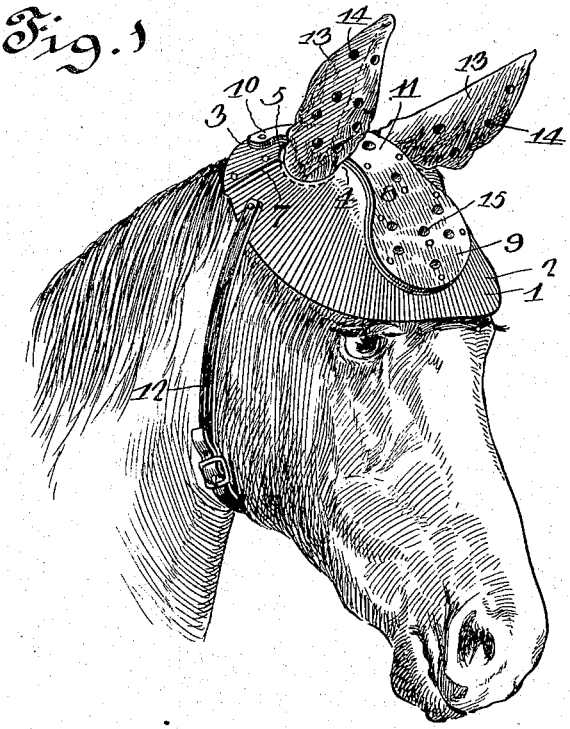
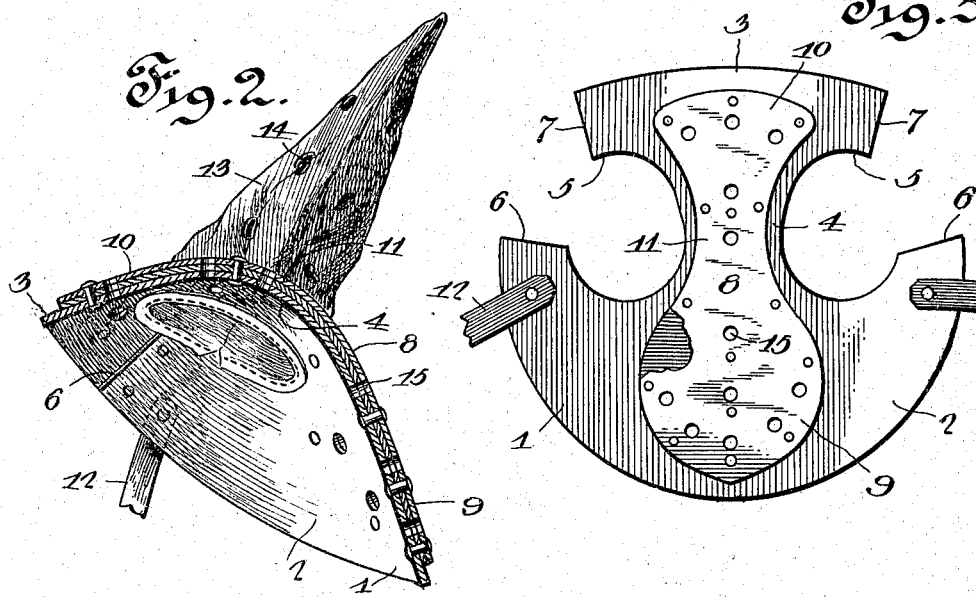
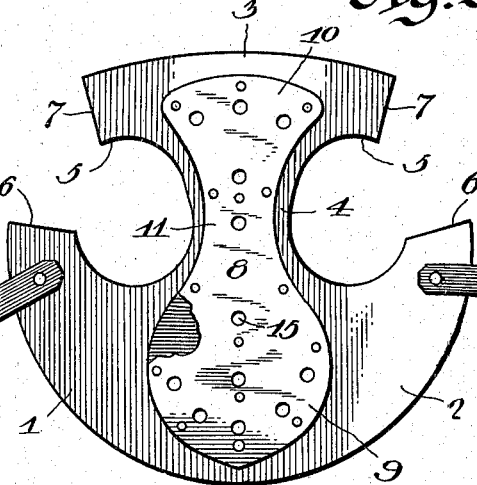
Witnesses
J. Frank Culverwell.
Chas. S. Hyer.
A. C. Young, Inventor
By his Attorneys,
C. A. Snow & Co.

UNITED STATES PATENT OFFICE.

ALBERT C. YOUNG, OF AMESVILLE, OHIO.

MINE-CAP FOR DRAFT-ANIMALS.

SPECIFICATION forming part of Letters Patent No. 669,909, dated March 12, 1901.

Application filed October 7, 1899. Serial No. 732,918. (No model.)

*To all whom it may concern:*

Be it known that I, ALBERT C. YOUNG, a citizen of the United States, residing at Amesville, in the county of Athens and State of Ohio, have invented a new and useful Mine-Cap for Draft-Animals, of which the following is a specification.

This invention relates to a mine-cap for draft-animals; and the primary object of the same is to provide a simple and effective shield to protect the head of the animal and prevent injury thereto by direct contact with the roof of a mine-lead or other depending or jutting obstructions, particularly in low places.
The invention consists in the construction and arrangement of the several parts in detail, which will be more fully hereinafter described and claimed.

In the drawings, Figure 1 is a perspective view of the improved device shown provided with ear-covers and applied in operative position. Fig. 2 is a longitudinal vertical section taken through the center of the device shown in Fig. 1. Fig. 3 is a top plan view of the shield broken away in part and shown without the ear-covers.

Similar numerals of reference are employed to indicate corresponding parts in the several views.

The numeral 1 designates the shield, which, as shown in Fig. 3, is formed from a blank of suitable material having the greater portion thereof of substantially semicircular form, as at 2, and the remaining part in the form of a rear tongue 3, connected to the top 2 by a neck 4, which is provided by cutting substantially oval openings 5 therein and which partially extend into the main part 2. Squared ends 6 and 7 are formed, respectively, at the rear of the part 2 and at opposite sides of the tongue 3, and said ends are adapted to be brought together and overlap and firmly secured by rivets or other fastenings to give the shield a shape approximating that of the top portion of the head of a horse or mule. By drawing the squared ends 6 and 7 together the substantially oval openings 5 are given a contour simulating that of the base of the ears of a horse or mule, and the greater portion of the shield is arranged to project forwardly or in advance of the ears and completely cover the forehead down close to the eyes. Through the center of the shield proper, as set forth, a reinforce 8 extends and is securely fastened on the exterior. The said reinforce is preferably formed of two plies or thicknesses of a suitable tough material that will resist wear and has a wide front member 9, which is located over the center of the forehead, and a slightly-narrower rear member 10, adapted to be positioned over the crown of the animal's head directly in rear of the ears. The members 9 and 10 are connected by an intermediate narrow neck 11, which is positioned between the ears when the device is applied, and it will be observed from the extent and shape of this reinforce that the vital members or portions of an animal's head are protected thereby. The shield 1 is provided with a soft lining or cushion, and the exterior portion thereof is made of tough material. Though it is not intended that the shield be limited in its make-up to any precise material it has been found by practical experiment that a suitable thickness of leather best serves the purpose, because it is less liable to be torn or cut and is therefore more durable and offers a better protection.

The improved device is intended to be used with or without a bridle and is held in place when applied by a throat-latch 12, and in some instances the device as thus far described may be used alone without other attachments, and when applied in operative position the ears of the animal will be slipped through the openings 5 and the throat-latch 12 connected and adjusted, as shown by Fig. 1.

As a valuable auxiliary to the shield it is proposed to secure in the openings 5 ear-covers 13, which are shaped to conform to the ears of a horse or mule and are preferably constructed of insulating material, such as rubber, rubber compound, or other substance. These ear-covers are large enough to easily slip over or be readily withdrawn from the ears of the animal and do not cause annoyance or inconvenience by pressure or prevent the animal from using or moving his ears. For healthful purposes the said covers are provided with ventilating-apertures 14, and by the use of the said devices the animal is shielded from injurious results which arise by contact with electric-light wires or other electric feeders within a mine. The shield 1 is also ventilated by the formation of apertures 15 through the reinforce and the portion of said shield thereunder, and the advantage of these apertures in the position specified will be obviously apparent.

Having thus described the invention, what is claimed as new is—

1. A shield for the purpose set forth, conforming in shape to the top portion of the head of a draft-animal and extending over the forehead, the crown between and in rear of the ears and the portions at the sides below the ears, the shield having openings therein for the passage of the ears therethrough, a reinforce extending centrally over the front and rear portions of the shield and between the openings for the ears, the reinforce and the portion of the shield therebeneath having ventilating-openings therein, and insulating ear-covers attached to the shield over the openings for the ears and also having ventilating-openings therein.

2. A mine-cap for protecting the head of draft-animals, comprising a leather shield having a permanent shape conforming to that of and fitting down flat over the top portion of the head of the animal, said shield forming a complete and continuous covering for the portion of the head to which it is applied and adapted to extend down over the forehead to the eyes, over the crown between and in rear of the ears and over the side portions of the head adjacent to and outside of the ears, openings being formed in the side portions of the crown inwardly from the adjacent side margins of the device, a reinforce extending centrally over the exterior of the shield and broadened over the forehead and at the rear behind the ears, and insulating ear-covers secured to the shield over said openings and conforming in shape to the ears of the animal to be protected, the shape of the shield permitting the use of a single fastening means to hold it in practically-applied position.

In testimony that I claim the foregoing as my own I have hereto affixed my signature in the presence of two witnesses.

ALBERT C. YOUNG.

Witnesses:
　D. W. YOUNG,
　M. E. GIBSON.